Jan. 12, 1937.  G. R. HOFFMAN  2,067,570
BRAKING MECHANISM FOR AUTOMOBILES
Filed Feb. 14, 1934

INVENTOR
Glenn R. Hoffman
BY
ATTORNEY

Patented Jan. 12, 1937

2,067,570

UNITED STATES PATENT OFFICE 2,067,570

BRAKING MECHANISM FOR AUTOMOBILES

Glenn R. Hoffman, St. Louis, Mo., assignor to Hoffman-Paulding Company, a corporation of Michigan Application February 14, 1934, Serial No. 711,242

3 Claims. (Cl. 188—106)

My invention relates to braking mechanism for vehicles, including automobiles or motor cars. It has for one object or purpose to provide a construction in which the train of brake applying mechanism leading from the emergency brake lever and also from the service brake lever, to the wheel brakes, will each include a floating fulcrum member connected with each other and also with the emergency brake lever and with the service brake lever, so that operation of either the emergency brake lever or the service brake lever will transmit braking power through both floating fulcrum members to the wheel brakes. Consequently should a brake occur in either train of brake applying mechanism, the brake applying power will be transmitted from either the emergency lever or from the service lever, according as one or the other is operated, through one or both of the floating fulcrum members connected with the wheel brakes.

The movement of one of the brake levers in no manner affects the movement of the other lever, as each is entirely independent of the other.

Figure 1:
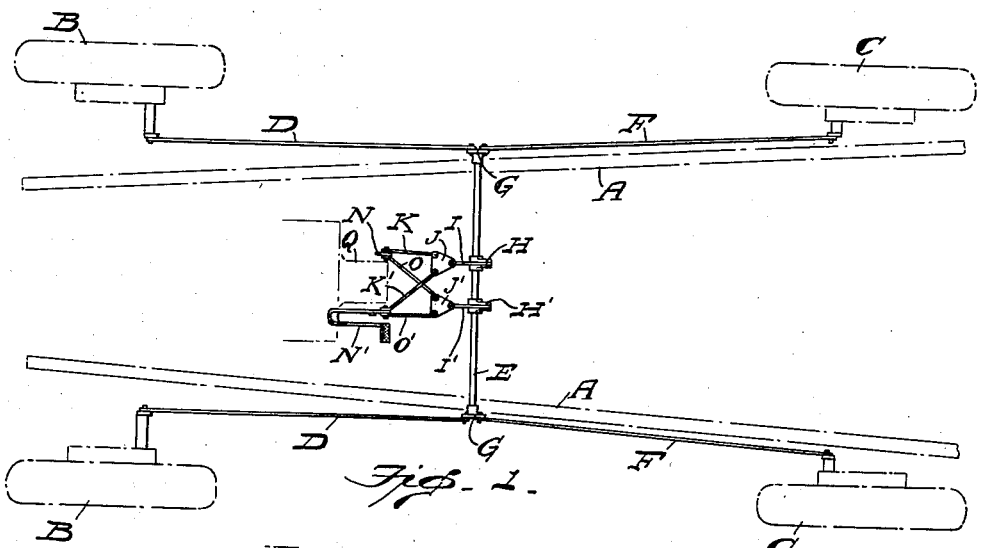
Figure 2:
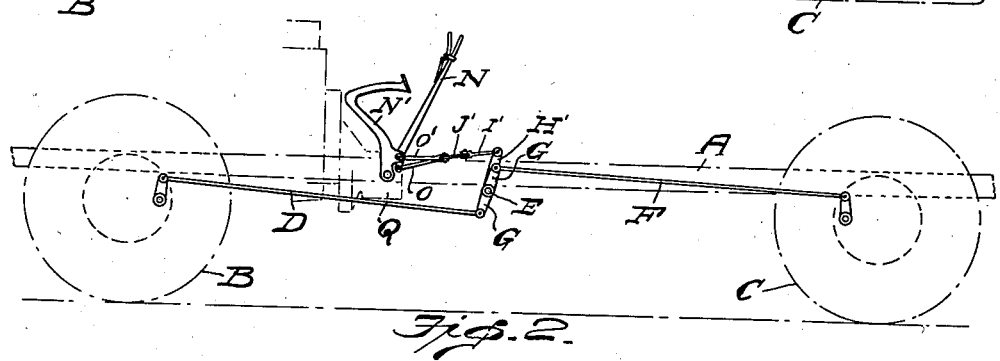
Figure 3:
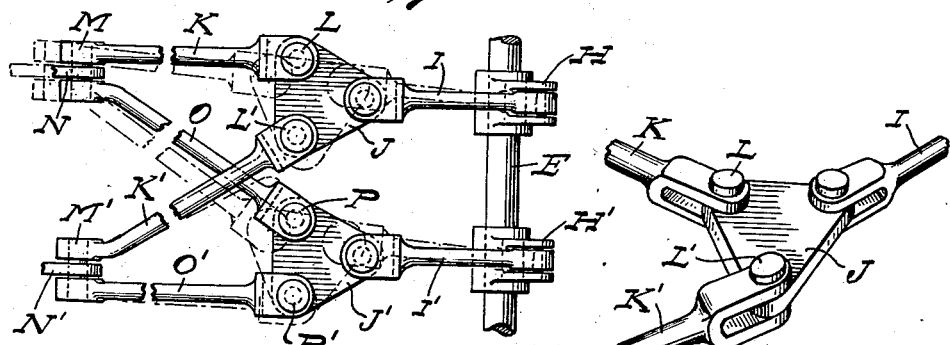
Figure 4:
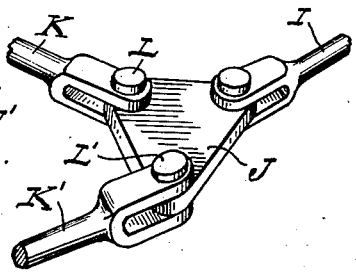

To the accomplishment of the foregoing and such other objects as may hereinafter appear, the invention consists in the features hereinafter particularly described and then sought to be clearly defined by the appended claims, reference being had to the accompanying drawing forming part hereof and in which:

Figure 1 is a diagrammatic illustration, in plan, of the invention;

Figure 2, a side elevation of Figure 1;

Figure 3, a plan view, enlarged scale, showing the floating fulcrums which couple the service and also the emergency brake lever with the rockshaft which has connections with the brakes of the four wheels of the vehicle;

Figure 4, a perspective detail showing one of the floating fulcrum members and manner of connecting both the service brake and the emergency brake levers thereto, and also the link connection between the floating fulcrum and rockshaft.

In the drawing the letter A designates a chassis frame of any approved type of motor car; B the front wheels; C the rear wheels; D brake rods leading from the brake bands, or brake shoes, of the front wheels to a crank shaft E through which power is transmitted to the brakes of the front wheels, and also through rods F with the brake bands or brake shoes of the rear wheels C. The brake bands or brake shoes and the manner of their connection with the power transmission means for applying the brakes are not illustrated in detail because any approved type, suitable for the particular make of car used, may be employed; and as the same does not constitute the present invention, it is not necessary to illustrate such details, which may be left to the mechanic skilled in this art. The adjacent ends of rods D, F, are pivotally connected to a double crank G, one at each end of the rock-shaft E which will be journaled in suitable boxings carried by the side bars of the chassis A. The rock-shaft is also provided with cranks H and H' which may be disposed at suitable points intermediate of the ends of the rock-shaft. The cranks H, H', are pivotally connected by links I, I' to floating fulcrum members J, J', respectively, the fulcrum members preferably being triangular in form. One corner of the base of floating member J has a link K pivotally connected to it, say by a pivot pin L, and the opposite end of the link will have a pivotal connection, say by a pivot M with the emergency brake operating handle or lever N. The opposite corner of the base of the triangle formed by floating member J will have one end of a link K' pivotally connected to it, say by a pivot pin L', and the opposite end of said link will be pivotally connected say by a pivot pin M' to a foot or service brake lever N'. One corner of the base of the triangular shaped floating member J' will have one end of a link O pivotally connected to it, say by a pivot pin P and its opposite end pivotally connected with the emergency hand operated lever N. The floating fulcrum member J' has also pivotally connected to one corner, at the base of its triangle, a link O', say by a pin P', the opposite end of the link having a pivotal connection, say by the pin M', with the foot or service brake lever N'. The emergency brake lever N may be suitably supported or fulcrumed at one side of the car transmission casing Q, conventionally indicated by dotted lines in Figures 1 and 2; and the foot or service brake lever may be suitably supported or fulcrumed at the opposite side of said casing, as indicated in Figures 1 and 2. The emergency and the service brake operating levers, however, may be otherwise disposed in relation to the transmission casing as may be desired to suit the particular make of car to which the parts are applied.

It will be observed from the foregoing that if either floating member J or J', becomes disabled, or put out of commission, by separation or disconnection of the links, or any of the links, which connect it with the service brake lever or with the emergency brake lever and with the rock-shaft, the service brake lever, and also the emergency brake lever, will function to apply the brakes through the floating fulcrum member not disconnected, or disabled. This is so because the service brake lever and also the emergency brake lever are connected with all the brakes through both floating fulcrum members. Therefore if connection between the service brake lever, or the emergency brake lever, and the wheel brakes should become disabled from functioning through the floating fulcrums, the service brake lever and the emergency brake lever will remain operative to function in application of the brakes through the floating fulcrum member not disabled.

In operation, when the service brake lever is operated, the floating fulcrum member J' will turn or fulcrum on the pivot or pintle P which will draw the link I' forward in the direction towards the service brake lever, and rotate the rock shaft E so as to apply the brakes to all four wheels. At the same time the other floating fulcrum member J will be pulled on through link K' and turn or fulcrum freely on the pivot or pintle L without affecting the emergency lever. On the other hand if the emergency brake lever be thrown by hand in the direction towards the floating fulcrum member J, said member J will turn on the pin or pintle L' and be carried to the position indicated by dotted lines in Fig. 2 of the drawing, and will apply the brakes under emergency conditions to all four wheels. At the same time the link O will be thrown to the position shown by dotted lines in Fig. 3, carrying with it the fulcrum member J' to the position indicated in dotted lines in the same figure, said floating fulcrum member turning freely on the pivot or pintle P' without affecting the foot service brake lever N'.

If portion of the braking mechanism between the rock shaft and either the service brake lever or the emergency brake lever becomes disabled and one lever thereby be put out of commission, the lever not put out of commission, whether it be the service or the emergency brake lever, will function to apply the brakes through the floating fulcrums not disabled or put out of commission. This is so because both the service brake lever and the emergency brake lever are connected with all the brakes through both floating fulcrum members and their connections with the wheel brakes. By connecting both floating fulcrums with each brake lever in the manner illustrated and described each lever is in position for immediate action, when and as needed, without any lost motion, and the action of one lever may supplement the action of the other; also if the connection between either of the two levers and rock-shaft becomes disabled from any cause, the other lever will function to apply the brakes. Each lever in its action is independent of the other lever, and the action of one does not affect the action of the other, and the operation of one will not "kill" or render inactive the operation of the other. Further, the number of parts in the train of brake applying mechanism is lessened, resulting in the cost of production and installation being made less.

It will be understood that recoil springs of the usual type may be used for restoring the service brake lever and the emergency brake lever to normal positions when and as desired; also that well known means may be employed for holding the service brake lever and the emergency brake lever in the position desired. Any of the well known constructions for doing the things stated may be employed and being well known to the skilled in the art need not be illustrated and described in detail.

While I have illustrated and described with particularity the features believed to be the best for practising the invention, it is to be understood that changes therein may be made without departing from the scope of the invention.

Having described my invention and set forth its merits what I claim is:

1. In a braking mechanism comprising brakes and service and emergency braking levers; a rock-shaft, rods having crank connection with the rock-shaft and connecting said shaft with the brakes, a service brake lever and an emergency brake lever, floating fulcrum members interposed between said levers and said rock-shaft, a link pivotally connected to each floating fulcrum member and having crank connection with the rock-shaft, a link connected at one end with the service brake lever and pivotally connected at the other end with one of the floating members, another link connected at one end with the service brake lever and pivotally connected at its opposite end with the other floating member, a link connected at one end with the emergency brake lever, and at its opposite end pivotally connected with one of the floating members, and another link connected at one end with the emergency brake lever and at its other end pivotally connected with the floating fulcrum member of the service brake lever, the connections of the links of the service and emergency brake levers with said floating fulcrum members being such that if either brake lever becomes ineffective to perform the normal function the other brake lever will function to serve both as a service and as an emergency brake lever.

2. In a braking mechanism including wheel brakes; service and emergency brake operating levers, means connecting said levers with the wheel brakes, said means including a plurality of floating fulcrum members operatively connected with each other and also with both the service and the emergency brake levers, whereby if either fulcrum member fails to function to apply the brakes under action of the brake levers, either the service or emergency brake lever will function through the other fulcrum member to apply the brakes.

3. In a braking mechanism comprising wheel brakes and service and emergency brake levers; floating members interposed between the service and emergency brake levers and the mechanism connecting them with the wheel brakes, and link connections between the fulcrum members and the brake operating levers, said link connections connecting each brake lever with both floating fulcrum members, the connection being such that in the event either fulcrum member becomes inoperative, either brake lever will act through the other fulcrum member to apply the brakes.

GLENN R. HOFFMAN.